Aug. 9, 1927.
F. D. BOWEN
1,638,390
HANDLE ATTACHMENT
Original Filed Nov. 1, 1922
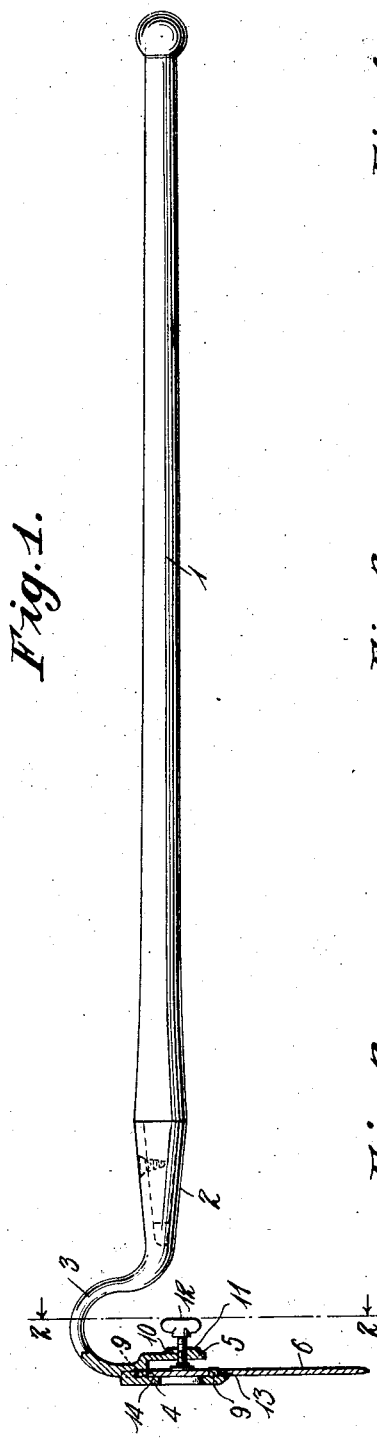
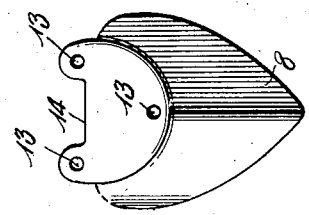
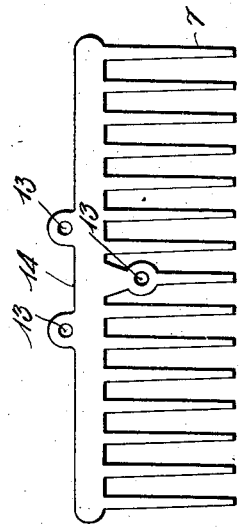
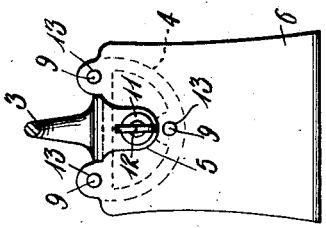
Inventor
Frederick D. Bowen
By Joseph H. Hunter
Attorneys Patented Aug. 9, 1927.

1,638,390

UNITED STATES PATENT OFFICE.

FREDERICK D. BOWEN, OF MONETT, MISSOURI.

HANDLE ATTACHMENT.

Application filed November 1, 1922, Serial No. 598,283. Renewed December 18, 1925.

My invention relates to improvements in interchangeable hoes of the type wherein a single handle is used in connection with several different types of interchangeable blades, which blades are adapted for use for different kinds of agricultural work.

The main object of my invention is to provide an implement of the character described, wherein the advantages of a number of different types of agricultural tools are combined in a single implement consisting of a single handle and several different types of blades each of which is adapted to be readily attached and detached from the handle.

A further object of my invention is to provide an implement of this character which will be simple in structure, and the blades of which can be quickly and securely positioned upon the handle, and when so positioned, there will be no tendency for the same to twist or be moved relative to the handle.

So that my invention may be more clearly understood reference may be had to the accompanying drawings of which—

Figure 1 is a side elevation of the device partly in section.

Figure 2 is a sectional view on line 2—2 of Figure 1.

Figures 3 and 4 are modified forms of implement blades to be used with the attachment.

1 designates a handle for a hoe or similar agricultural implement or tool, to which is secured, in any convenient way, a shank 2. Formed integral with said shank is a goose necked head 3, the outer end of the head having integral therewith two downwardly extending, spaced apart, vertical flanges 4 and 5 adapted to receive any one of a number of implement blades as 6, 7 and 8. The outer flange 4 is of approximately semicircular formation, and has provided at three symmetrically arranged points inwardly projecting lugs 9. The inner flange 5 has provided near its lower end an aperture 10 extending through an enlarged part 11 of the flange. This aperture is preferably located opposite the central part of the triangular shaped flange 4, and a set screw 12 is adapted to extend through said aperture 10 and bear against the upper face of one of the implement blades when the same is in position between the two flanges.

Each of the blades, which are of different types whereby each can be used for different purposes, are provided at the upper end thereof with apertures 13 spaced in triangular formation.

It is also intended to provide at the upper end of each of said blades a seat 14, which fits snugly around the point of juncture of the two flanges 4 and 5 when the blade is positioned therebetween.

In positioning these different blades upon the head the seat 14 and upper part of the blades are fitted between the two flanges 4 and 5, the apertures 13 receiving the lugs 9 and the seat 14 fitting around the point of juncture of the two flanges. The set screw 12 is then tightened and bears against the blade, thereby securely clamping the same in position upon the head.

It will be noted that the spaced apart lugs upon the outer flange which penetrate the apertures in the blade, when the same is in position, and the set screw bearing against the blades from the opposite flange, the seat 14 formed on the blades, and the general structure of my handle and blades is such that insures a device which is very handy around the garden, etc., and permits the rapid application to the head of any of the different types of blades, and insures a simple but positive means for securely clamping the blades in position, which clamping means will firmly hold the blades upon the head and prevent the twisting of the same when in use, owing primarily to the three point support afforded by the three lugs 9 which will positively hold the head against any tendency to twist or shift with relation to the handle when the implement is in use.

Having thus described my invention what I claim is:

In a device of the character described, the combination with a shank, of a plate integral therewith and extending at right angles thereto, a plurality of studs projecting from one face of said plate, a lug integral with said shank and extending at right angles thereto and in spaced parallel relation to said plate, a tool element having apertures corresponding with and adapted to receive said studs, said tool element being received between said lug and plate and held in place by the said studs, and a set screw threaded thru said lug and engaging said tool element for holding the latter firmly in engagement with said plate.

In testimony whereof I affix my signature

FREDERICK D. BOWEN.